Dec. 10, 1946.   P. F. SHIVERS   2,412,541
ALTIMETER
Filed Nov. 20, 1942   5 Sheets-Sheet 2

Inventor
PAUL F. SHIVERS
By
George H. Fisher
Attorney

Dec. 10, 1946.  P. F. SHIVERS  2,412,541
ALTIMETER
Filed Nov. 20, 1942  5 Sheets-Sheet 4

Inventor
PAUL F. SHIVERS
By
George H. Fisher
Attorney ns Dec. 10, 1946

2,412,541

UNITED STATES PATENT OFFICE 2,412,541

ALTIMETER

Paul F. Shivers, Edina, Minn., assignor to Minneapolis-Honeywell Regulator Company, Minneapolis, Minn., a corporation of Delaware Application November 20, 1942, Serial No. 466,283

15 Claims. (Cl. 73—387)

My present invention relates to measuring instruments of the type which indicate changes in the magnitude of a variable condition by their response to related changes in the pressure of a gas mass. More specifically, my invention relates to the field of altimeters which indicate variations in altitude above a reference point by responding to the corresponding variations in the static air pressure (that is, the barometric pressure).

The static pressure indicated by such an instrument is influenced by the altitude of the instrument and by the density of the air mass and its temperature gradient. For the sake of uniformity in instrument dial calibration, certain arbitrary values of density and temperature have been selected to define a "standard atmosphere." This standard atmosphere is of such density as to give a barometric pressure at a point one foot above sea level equal to that of a column of mercury 29.92 inches high. The temperature gradient in the standard atmosphere is such that at sea level the temperature is 59° F., while the temperature is —67° at the bottom of an isothermal layer which has been found to exist at a variable height of approximately 35,000 feet in middle latitudes. In this standard atmosphere the barometric pressure has been found to have an inverse logarithmic relation to the altitude, and pressure responsive means have been designed to give indications on a linear scale in response to logarithmic changes in pressure. The altitude on this scale corresponding to any given static pressure is called the "pressure altitude" of the point at which the pressure indication is observed, and is the altitude indicated by an uncompensated altimeter.

The atmosphere enveloping a craft in flight is not normally this standard atmosphere, however, but differs therefrom in sea level static pressure and in temperature gradient. The pressure altitude therefore does not normally coincide with the actual altitude or elevation above the reference point. Variations of hundreds of feet of indicated altitude may occur at a given locality due to extreme barometric fluctuations, and similar variations of as much as twenty per cent may be caused by variations of temperature from the standard.

It is an object of my invention to provide, in a pressure responsive instrument for measuring altitude, novel means for adjusting the instrument to compensate for the differences between the standard atmosphere and the actual atmosphere between the instrument and a reference point.

It is another object of my invention to provide means operatively connecting a pressure responsive member and an indicating member, in an instrument such as I have described, the connection being adjustable to compensate for differences, in density and temperature, between the standard atmosphere and the actual atmosphere between the instrument and the reference point.

Another object of my invention is to provide novel means, in an instrument such as I have described, for increasing or decreasing the altitude indicated by the instrument in accordance with increase or decrease of the density of the atmosphere between the instrument and the reference point.

A further object of my invention is to provide novel means, in an instrument such as I have described, for adjusting the instrument to compensate for differences between the mean temperature of the standard atmosphere and the mean temperature of the atmosphere between the instrument and the reference point.

Yet another object of my invention is to provide novel means, in an instrument such as I have described, for adjusting the indications of the instrument in accordance with variation in the temperature at the reference point.

A still further object of my invention is to provide novel means, in an instrument such as I have described, for adjusting the indications of the instrument simultaneously in accordance with the temperature at the instrument and the temperature at the reference point.

Another object of my invention is to provide independently responsive means for simultaneously varying the indications of an instrument such as I have described with variation in the ambient pressure and the ambient temperature, further independent means being provided for adjusting the instrument to compensate for variations in the temperature and density of the atmosphere at the reference point.

It is an object of my invention to provide, in an instrument such as I have described, novel means for adjusting the operative standard of the instrument (that is, the ratio between the rate of change of indicated altitude and the rate of change of ambient pressure), in accordance with variations of the temperature of the atmosphere between the instrument and the reference point.

Another object of my invention is to provide separately operable control means for electrically adjusting an altimeter for air temperature and pressure at the reference point and for responsively influencing the reading of the altimeter in accordance with the temperature and static pressure of the ambient atmosphere.

It is also an object of my invention to provide electrical means for the transmission of atmospheric pressure changes to indicating means whereby to eliminate insofar as possible mere mechanical means for the amplification of the movement of the pressure responsive means.

Another object of my invention is to provide a balanced electrical bridge circuit and means for unbalancing the circuit operated by the pressure responsive member or aneroid of an altimeter, whereby, upon a change in the position of the aneroid, the indicator means of the altimeter may be actuated and the aneroid returned to the original or zero position so as to eliminate insofar as possible mechanical or moving parts through which mechanical error might arise.

Further, it is an object of my invention to provide control means for adjusting or varying the return or zero point of a counterbiased aneroid for a given ambient pressure, such control means being regulated by a temperature responsive means.

Another object of my invention is to provide a pressure responsive altimeter and electrically operated means for the automatic correction of the indication of the instrument for the influence of changes in atmospheric temperature.

It is also an object of my invention to provide in an altimeter a plurality of photoelectric cells and a plurality of separate means for varying the relative electronic emissions therefrom so as to regulate the zero or return point of a counterbiased atmospheric pressure responsive member or aneroid for a given ambient pressure, one of said means being controlled by the atmospheric pressure responsive member and the other of said means being controlled by a temperature responsive means.

Another object of my invention is to provide an instrument which will utilize an outside source of power for operating the gear train of the indicating mechanism, instead of utilizing the relatively small movement and power of the atmospheric pressure responsive member or aneroid, and in addition to so arrange the pressure responsive member or aneroid that it will have to work through only a very small range of movement.

Another object of my invention is to provide control means for adjusting or varying the return or zero point of the aneroid or atmospheric pressure responsive member of my invention, for a given ambient pressure, whereby the ratio between barometric pressure and indicated altitude may be increased or decreased.

Another object of my invention is to provide control means for varying the operative standard or translation factor of an instrument such as I have mentioned in accordance with variations in atmospheric conditions.

A further object of my invention is to provide, in an altimeter, a plurality of photoelectric cells subjected to illumination from a source of light and control means adapted to regulate the illumination of the photoelectric cells whereby to cause actuation of the indicator means of the altimeter.

An additional object of my invention is to provide, in an altimeter, a balanced bridge circuit and adjustable means for unbalancing the circuit so as to cause actuation of the altimeter indicator means.

Other objects and advantages of this invention are set forth in the following description, taken with the accompanying drawings, and the novel features thereof are pointed out in the appended claims. The disclosure, however, is illustrative only and I may make changes in detail, especially in matters of shape, size and arrangement of parts within the principle of the invention, to the full extent indicated by the broad and general meanings of the terms in which the appended claims are expressed.

In the accompanying drawings wherein like reference characters indicate corresponding parts in the various figures.

Figure 11:
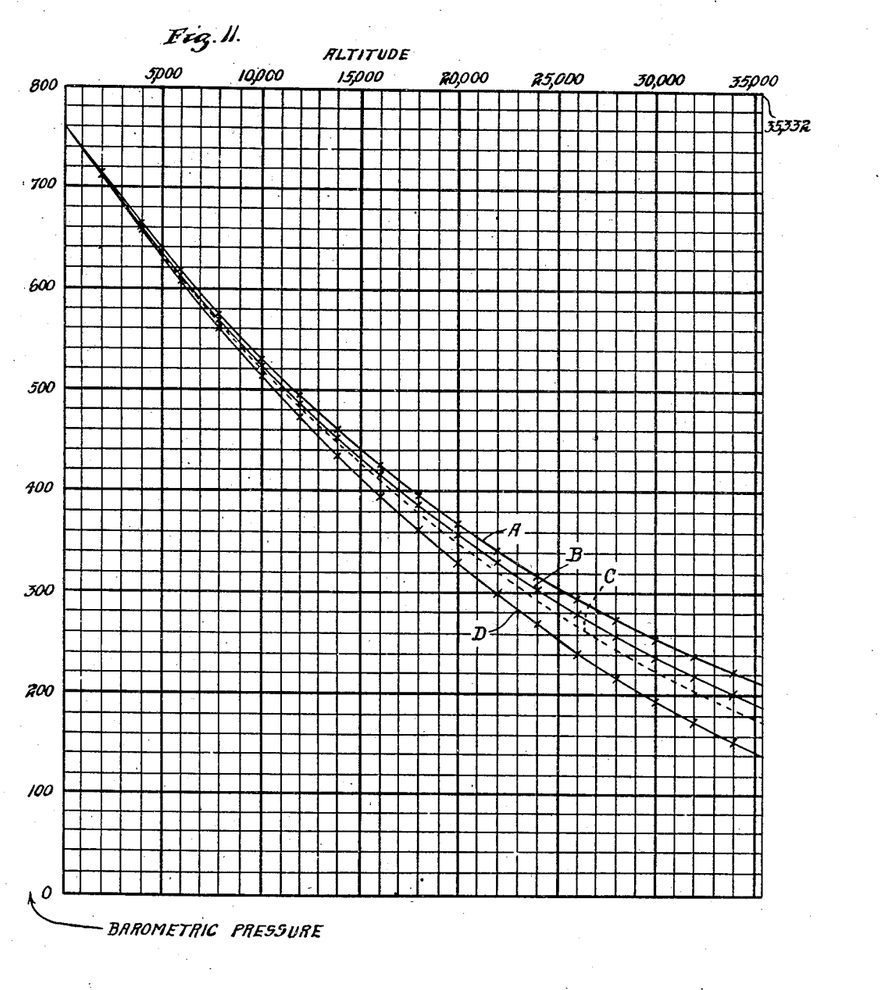
Figure 11 illustrates graphically the effect on barometric pressure of variation of the actual mean temperature from an assumed standard mean temperature as the altitude increases and showing that the greater the rate of temperature drop per unit change in altitude the lower the barometric reading for any given altitude.

In each of the curves of Figure 11 the ground barometric pressure at sea level is assumed to be 760 millimeters of mercury. Starting with this value, the line designated by the letter A indicates the relationship between altitude and barometric pressure under a hypothetical condition wherein the temperature of the air is constant at all levels. The line indicated by the letter B indicates the relationship between altitude and barometric pressure under a second hypothetical condition wherein the temperature of the atmospheric air at sea level is assumed to be —15° C. and there is a decrease in the temperature of substantially 1.13 degrees centigrade for every 1000-foot increase in altitude until the isothermal layer is reached at the 35,332 foot altitude level where the air has a temperature of —55 degrees centigrade. Under such conditions the mean temperature of the air column is substantially —35 degrees centigrade. The line designated by the letter C illustrates the relationship between altitude and barometric pressure under conditions most generally assumed as standard in the calibration of the conventional altimeter: the temperature of the atmospheric air at sea level is assumed to be +15 degrees centigrade and for every 1000-foot increase in altitude the temperature decreases substantially 2 degrees centigrade until the isothermal layer is reached at which point the temperature of the air is −55 degrees centigrade. Under such assumed standard conditions the air column has a mean temperature of −20 degrees centigrade. The line D indicates the relationship between altitude and atmospheric barometric pressure under a hypothetical condition wherein the temperature of the atmospheric air at sea level is assumed to be +145 degrees centigrade and there is a decrease in the temperature of the atmospheric air of 5.66 degrees centigrade for every 1000-foot increase in altitude until the isothermal layer is reached with a temperature of −55 degrees centigrade. The latter air column has a mean temperature of +45 degrees centigrade.

The computations of the aforenoted graph are derived from report No. 538 of the National Advisory Committee for Aeronautics and the altitude pressure tables contained therein based on the United States Standard Atmosphere. From a study of the foregoing graph it will be seen that the greater the rate of temperature decrease with change in altitude the lower the barometric reading for any given altitude. Thus in an atmosphere where the rate of temperature decrease with change in altitude is greater than that in the standard atmosphere, the barometric pressure at any level is greater than that in the standard atmosphere, and an uncorrected altimeter indicates too low an altitude. Similarly, in an atmosphere where the rate of temperature decrease with change in altitude is less than that in the standard atmosphere, an uncorrected altimeter indicates too high an altitude.

My invention embodies means for automatically correcting said erroneous indications of an altimeter so that the instrument will give correct altitude indications regardless of whether the temperature conditions of the ambient atmosphere coincide with or diverge from those of the standard atmosphere.

Figure 1:
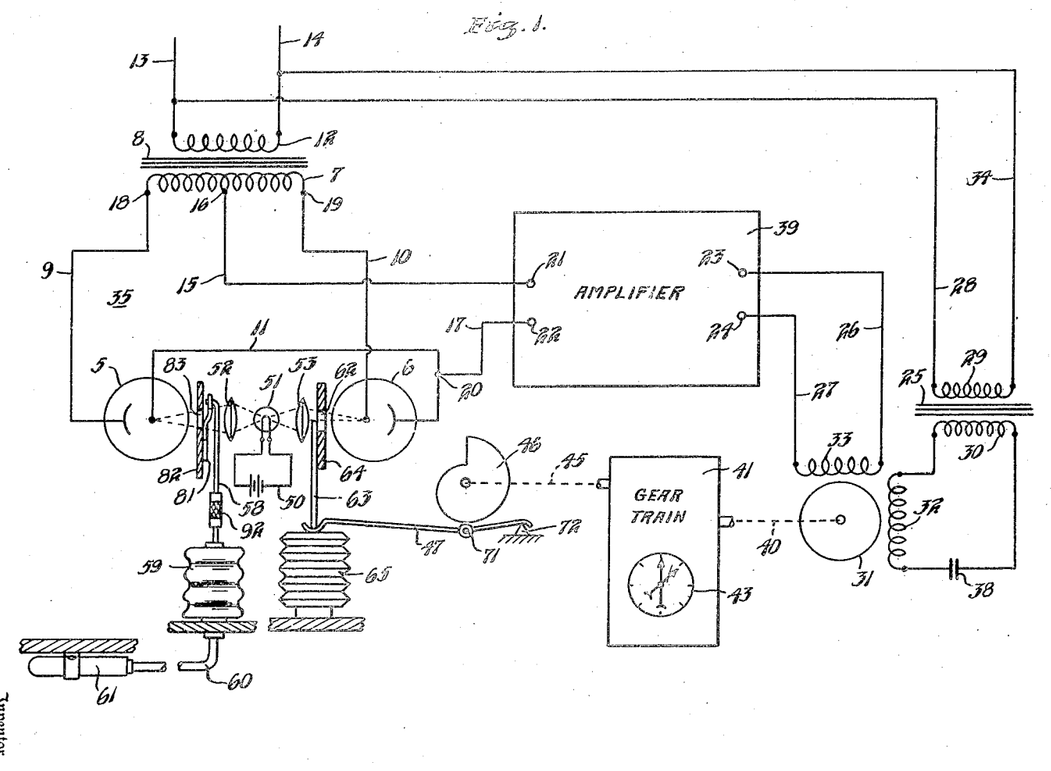
Figure 1 represents diagrammatically one form of my invention.

In the form of my invention illustrated in Figure 1 there is shown a pair of photo-electric cells indicated respectively by the numerals 5 and 6. The cells are connected in series with the center tapped secondary winding 7 of a transformer 8 by means of conductors 9, 10, and 11, the latter conductor joining the cathode of cell 6 with the anode of cell 5. Current is supplied to the secondary winding 7 of transformer 8 by transformer action from a primary winding 12 which, through conductors 13 and 14, is connected to a suitable source of alternating current.

The space between the cathode and anode of photo-electric cells, as is well known in the art, becomes conductive upon the exposure of the cathode to light due to the electron discharge from the cathode. Thus, the cells may be considered as partial conductors, or variable resistors, when variably exposed to light, the resistances of such resistors depending directly upon the amount of light supplied thereto.

It will be apparent that cells 5 and 6 act as variable impedances to constitute two adjacent arms of a bridge circuit indicated generally by the numeral 35, of which the remaining two adjacent arms comprise the halves of secondary winding 7. Terminals 18 and 19 of secondary winding 7 comprise the input terminals of the bridge circuit and a pair of output conductors 15 and 17 are connected respectively to center tap 16 and to a terminal 20 on conductor 11. Center tap 16 and terminal 20 constitute the output terminals of bridge circuit 35, and are connected by output conductors 15 and 17 with the input terminals 21 and 22 of a thermionic amplifier indicated generally by the numeral 39, and having output terminals 23 and 24. This bridge circuit is designed so as to be balanced when the amounts of light supplied to the cells bear a predetermined ratio to each other. Any decrease under the predetermined ratio of the light supplied to cell 5 to that to cell 6 causes a proportional increase in the resistance of cell 5, unbalancing the bridge circuit in such fashion that a potential difference appears between terminals 20 and 16 having the same polarity and time-phase relation as the potential between terminals 18 and 16, and of a magnitude proportional to the unbalance of the bridge. This potential difference is fed through conductors 15 and 17 to input terminals 21 and 22 of amplifier 39.

Further, an increase over the predetermined ratio of the light supplied to cell 5 to that to cell 6 causes a proportional decrease in the resistance of cell 5, unbalancing the bridge circuit in such fashion that a potential difference appears between terminals 20 and 16 having the same polarity and time-phase relation as the potential difference between terminals 19 and 16, and also of a magnitude proportional to the unbalance of the bridge. This potential difference is also fed directly to terminals 21 and 22 of amplifier 39.

Since the instantaneous potential difference between terminals 18 and 16 is 180° out of phase with that between terminals 19 and 16, it will be seen that the potential difference impressed across terminals 21 and 22 of amplifier 39 when the resistance of cell 5 is decreased is of the opposite phase to that impressed on the amplifier input when the resistance of cell 5 is increased.

The electronic amplifier 39 may be of any suitable type well known in the art such as shown in Patent No. 1,536,233, granted May 25, 1925, to Anschutz-Kaempfe, or may be preferably an amplifier of the type shown and described in the co-pending application of Albert P. Upton, Serial No. 437,561, dated April 3, 1942, and assigned to the assignee of the present application.

A motor 31 is shown as being of the split phase type having a pair of field windings 32 and 33 which are mechanically 90 degrees apart in phase. Winding 33 is connected by the conductors 26 and 27 to the output terminals 23 and 24 of the amplifier 39, and is energized only by the output of amplifier 39.

A transformer 25 is provided for continuously energizing the motor winding 32, the transformer having a primary winding 29 and a secondary winding 30. The primary winding 29 is connected through conductors 28 and 34 to conductors 13 and 14. Current is supplied to the secondary winding 30 through transformer action from the primary winding 29.

Motor winding 32 is continuously energized from the secondary winding 30 of the transformer 25. A condenser 36 is connected in series with the secondary winding 30 and the motor winding 32 and causes a phase displacement of substantially 90° between the current flowing in the winding 32 and the terminal voltage of secondary winding 30.

As described in detail in the co-pending Upton application previously referred to, amplifier 39 is of a type which produces in the output circuit including conductors 26 and 27 and motor winding 33 an alternating current of the same frequency and phase as the potential applied to input terminals 21 and 22. Since transformer primary windings 29 and 12 are both connected to the same alternating current supply lines 13 and 14, it will be understood that the potentials appearing at the terminals of the secondary windings 30 and 7 are of the same phase. The current flowing through winding 32 is, however, shifted substantially 90 electrical degrees with respect to this potential by the condenser 38, as previously explained. The winding 33, on the other hand, is supplied with current either in phase or 180° out of phase with the terminal potential of windings 7 and 30 depending upon the direction of unbalance of the bridge circuit 35.

In accordance with the well known characteristics of a split phase motor, when the windings 32 and 33 are supplied with currents 90° out of phase, the motor 31 is caused to rotate in a predetermined direction, depending on which of the currents lags and which leads. The operation of a split phase motor of the type described herein is well known in the art and is described in the co-pending Upton application previously referred to.

The motor 31 is arranged to drive a shaft 40 in a direction depending upon the sense of the unbalance of the bridge circuit 35 and the resultant phase of the current supplied from the amplifier to the motor 31. The shaft 40 is, in turn adapted by suitable means such as a gear train conventionally indicated at 41 to drive an indicator means 43, which is of a suitable type well known in the art. Moreover, the motor 31 is further adapted by suitable means such as the shaft 40, train of gears 41, and a further shaft 45 to turn a cam 46 which cooperates with a roller member 71 mounted on a loading spring 47 for the adjustment of the tension in the spring 47. The loading spring 47 is pivoted at one end on a knife edge 72 and operably engages at the opposite end an aneroid 65, exerting a compressive force on the aneroid 65 dependent in magnitude upon the adjustment of the tension maintained in the loading spring 47 by the cam 46.

As shown in Figure 1, there is mounted between the photo-electric cells 5 and 6 an illuminating lamp 51, energized through a suitable electric circuit 50; this lamp provides the sole source of light for the cells. Suitable means are provided such as lenses 52 and 53 for directing the light rays from the lamp 51 to the respective photo-electric cells 5 and 6.

Figures 2, 3, 4, 5:
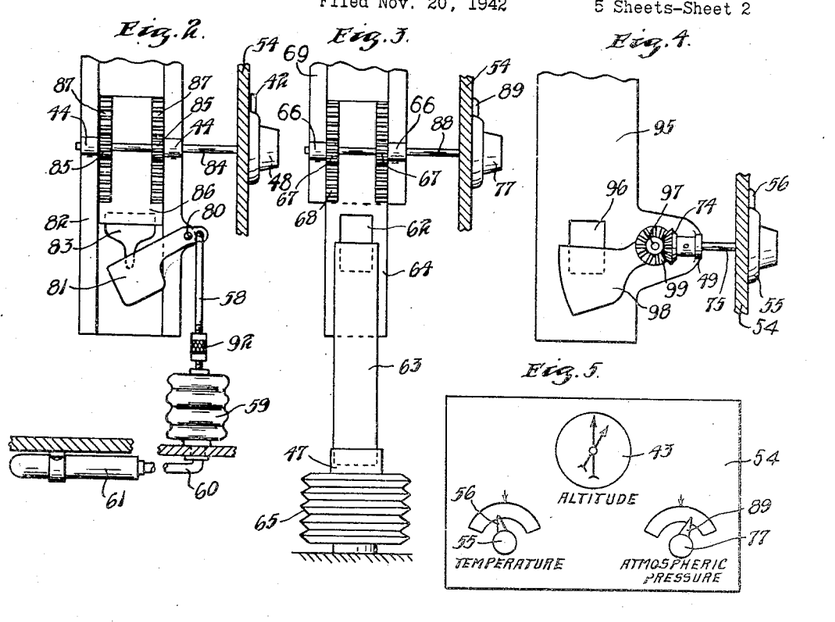
Figure 2 is an enlarged end view of the temperature compensating control means shown in Figure 1.
Figure 3 is an enlarged end view of the atmospheric pressure responsive control member of Figure 1.
Figure 4 represents a modified form of manually operable temperature compensating control means.
Figure 5 is a front elevational view of the control panel of my invention shown in Figure 1 with the manually operable temperature compensating control means of Figure 4.

In order to control the supply of light to the photo-electric cell 6 suitable control means are provided which, as shown in Figure 3, may comprise an adjustable member 64 having provided therein an aperture 62, for the passage of the light rays from the lamp 51 to the photo-electric cell 6, and a control slide 63 for regulating the supply of light passing through the aperture 62 to the photo-electric cell 6. The control slide 63 is operatively affixed at one end to a resilient bellows or other pressure responsive member 65 which may conveniently be referred to as an aneroid, 65 and the loading spring 47. The expansive force exerted by the aneroid 65 is counteracted by the atmospheric pressure acting upon the aneroid 65 and by the force exerted on the aneroid 65 by the spring 47. Spring 47 is operatively adjusted by cam 46, in response to motor 31, so as to increase or decrease the force exerted by spring 47 upon the aneroid 65, as previously explained.

The member 64 is adapted to be slidably adjusted by a vernier adjustment knob 77 mounted on an instrument panel 54 whereby the member 64 may be moved linearly with respect to member 63, whereby to vary the portion of aperture 62 covered by member 63. Knob 77 has a pointer 89 for cooperation with suitable scale markings carried by panel 54, and is connected by a shaft 88 to vernier pinions 67 which operatively engage rack teeth 68 formed on the slide 64 as shown in Figure 3. The shaft 68 is suitably journalled in bearings 66 mounted on a fixed member 69.

The cam 46 turns in a clockwise direction as the altitude increases and is so shaped as to progressively decrease the vertical adjustment imparted to the roller 71 per unit of rotary motion conveyed by shaft 45 as the altitude readings of the indicator increase. Thus, at ground level for example, cam 46 is positioned so that roller 71 is near its closest approach to the center of shaft 45, and upon a decrease in pressure the aneroid 65 expands upward. Since at this point the relative movement of cam 46 necessary to lower roller 71 to increase the force exerted by spring 47 to balance the circuit is relatively slight, the indicator recording for such a movement is correspondingly slight. However, at relatively high altitudes, cam 46 is correspondingly adjusted so that roller 71 is relatively widely spaced from the center of shaft 45, and considerably greater rotary movement of cam 71 is necessary to cause sufficient increase of the spring tension to return the slide 63 so as to balance the circuit. This increases the necessary rotary movement of the shaft 45 and causes a correspondingly greater indicator recording per unit of pressure change. This variation in the multiplication ratio of the indicator means, as the altitude increases, is necessary in order to approximate the true altitude, since, as previously explained, the vertical distance traveled for each unit of pressure fall increases with the altitude.

The operation of this portion of my invention will now be apparent. In the normal position of the slider 63 the amount of light passing through aperture 62 and falling upon photoelectric cell 6 is equal to the amount falling upon photoelectric cell 5, and the bridge accordingly is in balance. Upon a decrease in atmospheric pressure, aneroid 65 expands, causing slider 63 to move upwardly to decrease the area of aperture 62 and thus to decrease the light falling on photoelectric cell 6. The resistance of the cell is thereby increased, unbalancing the bridge circuit in a first direction. The unbalance potential acts through amplifier 39 to energize winding 33 of motor 31 in a first time-phase relationship. Motor 31 operates in such a direction as to rotate cam 46 in a clockwise direction until the force exerted on aneroid 65 by spring 47 has been increased by an amount equal to the decreased compressive force of the atmospheric pressure on the aneroid. This increase in the force of spring 47 is accompanied by a compression of the aneroid, and slider 63 moves downward with it, thus increasing the area of aperture 62 until equal amounts of light fall on both photoelectric cells. The bridge circuit is now again balanced, and operation of motor 31 is accordingly interrupted. Actuation of the motor has at the same time resulted in changing the reading of member 43 so that it indicates a higher altitude.

In the same fashion, upon an increase in atmospheric pressure aneroid 65 contracts, causing slide 63 to move downward to increase the area of aperture 62 and thus to increase the light falling on photoelectric cell 6. The resistance of the cell is thereby decreased, unbalancing the bridge circuit in an opposite sense to that just described. The unbalance potential acts through amplifier 39 to energize winding 33 of motor 31 in a second time-phase relationship which is also opposite that just described. Motor 31 therefore operates this time in such a direction as to rotate cam 46 in a counterclockwise direction, until the force exerted on aneroid 65 by spring 47 has been reduced by an amount equal to the increased compressive force of the atmospheric pressure on the aneroid. This reduction in the force of spring 47 is accompanied by an expansion of the aneroid, and slide 63 moves upward with it, thus decreasing the area of aperture 62 until equal amounts of light fall on both photoelectric cells. The bridge circuit is again in balance and operation of motor 31 is accordingly interrupted. This actuation of motor 31 has, however, resulted in change in the reading of member 43 so that it now indicates a lower altitude.

It will be understood that the resistance of cell 6 is determined by the area of aperture 62 through which light from the source 51 may pass, and that an increase of this area due to raising the upper edge by operation of knob 77 produces the same effect as an equal increase of the area due to lowering the lower edge by the operation of aneroid 65. If the barometric pressure at the reference point is greater than standard, the static pressure at all levels also exceeds that of the standard for that level, and the aneroid is at all levels compressed beyond the amount which is proper for an accurate reading of altitude in the standard atmosphere for which the instrument is calibrated. This in turn means that aperture 62 is at all times of too great area. It will now be apparent that actuation of knob 77 to move member 64 in a downward direction has the effect of partially closing the aperture, and that by suitably calibrating the rectilinear response of aneroid 65 to changes in static pressure, the rectilinear movement of member 64 corresponding to a unit of the scale on panel 54, the graduations on indicator 43, the outline of cam 46, and the tension in spring 47 (the outline of aperture 62 also being considered) the indicator may be made direct reading in altitude above an arbitrary level, regardless of changes in the density of the air. The reverse of this is true if the pressure at the reference point is below standard.

As I have previously explained in connection with Figure 11, the barometric pressure at any altitude, and therefore the pressure altitude or indication of an uncorrected altimeter, is influenced by the mean temperature of the air column between the observer and the ground. This I have illustrated in Figure 6, which shows that although the indicated altitude under high and low mean temperature conditions is the same as the actual altitude under the standard temperature conditions, the actual altitude of the observer is above the indicated altitude in the case of high mean temperatures and below it in the case of low mean temperatures.

Figure 6:
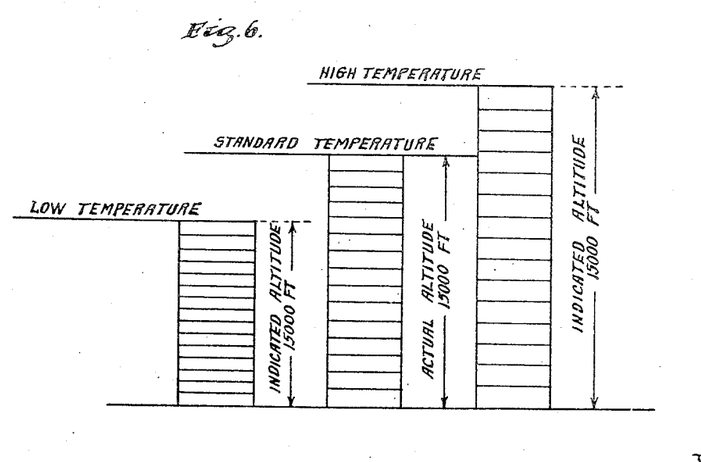
Figure 6 is a pictographical representation illustrating the variation in indicated pressure altitudes from an assumed standard altitude due to changes in atmospheric pressure caused by variation in the temperature of the mass or atmospheric air column above and below the assumed standard temperature.

Thus, it will be seen that under such conditions varying altitude indications may result at a given altitude level depending upon the state of the air column whether contracted or expanded.

In order to obviate inaccuracies in the indication of my instrument due to the effect of temperature changes, I have provided in the form of my invention illustrated in Figure 1 (as best shown in Figure 2) a fixed light control member 82 having an aperture 83 of a selected outline. A shutter 81 is pivotally attached by a suitable pivot 80 to the fixed member 82. The pivoted shutter 81 is operatively connected by a rod 58 to a free air temperature responsive device of the fluid filled type including a bellows member 59. The lower end of member 59 has connected thereto a conduit 60 which connects remotely with a free air thermometer bulb element indicated by numeral 61. The thermometer bulb element 61 is preferably mounted so as to contact the free atmospheric air so that the fluid therein may respond volumetrically to the temperature of the free air atmosphere. It will thus be readily seen that as the free air temperature decreases the member 59 contracts causing the rod 58 to rotate the shutter 81 in a clockwise direction about pivot 80, so as to progressively close the slot 83 and thereby decrease the flow of light to the photo-electric cell 5.

A manually adjustable turnbuckle 92 is provided for regulating the length of rod 58. It will be realized that the fluid contained in members 59, 60, and 61 is also subject to expansion with release of pressure on bellows 59 due to increase of altitude. The actuation of indicator 43 due to the energization of motor 31 by amplifier 39 is dependent in magnitude on the ratio between the resistance of photocells 5 and 6, that is, on the ratio of the quantities of light impinging upon the anodes of the two tubes. The rectilinear response of bellows 59 to changes in pressure, its response to changes in temperature, and the outline of aperture 83 are so selected that if the length of rod 58 is adjusted by means of turnbuckle 92 to bring shutter 81 flush with the bottom of aperture 83 when the instrument is under standard conditions at the reference point, the relative occlusion of apertures 83 and 62 with rise of the craft through a standard atmosphere causes uniform increment in the indications of indicator 43. For a rise of the instrument through an atmosphere having a temperature gradient other than standard the relative occlusion of aperture 83 by shutter 81 is determined as before by the joint effect of temperature and pressure changes on 59 taking place at a different rate so that a factor proportional to the departure of the temperature gradient through which the craft is rising from the standard gradient is introduced into the signal effecting actuation of indicator 43. It will further be noticed that this factor occurs independent of and may occur simultaneously with change in the factor influenced by variation in pressure, controlled by member 63 and aperture 62.

The purpose of turnbuckle 92 is to bring the upper surface of shutter 81 flush with the lower portion of aperture 83 in the beginning of the rise of the craft, so that there will be no period during which the shutter is moving with respect to member 82 and yet not varying the occlusion of aperture 83. Not only the temperature gradient through which a craft must rise from a given reference level, but the temperature at the starting level may vary from the standard. The mechanism I have just described has been provided to permit correction of the instrument for variations in gradient, but I also provide means for correcting the indications of the instrument for variations in the temperature at the reference level. For this purpose there is provided a slide 86 having mounted thereon rack teeth 87 operably engaged by a pair of pinions 85. The pinions 85 are connected to a shaft 84 journalled in bearings 44 mounted on the member 82, the shaft 84 projecting through a suitable control panel 54. Mounted at the free end of the shaft 84 is an adjustment knob 48 having provided a pointer 42 for cooperation with suitable scale markings on the control panel 54. Thus, by adjusting the knob 48 the slide 86 may be raised or lowered with respect to the slot 83 and the flow of light to the cell 5 through the slot 83 thereby adjusted.

It will be understood that the resistance of cell 5 is determined by the area of aperture 83 through which light from source 51 may pass, and that an increase of this area due to raising the upper edge by operation of knob 48 produces the same effect as an equal increase of the area due to lowering the lower edge by operation of bellows 59. If the temperature at the reference point is above the standard, bellows 59 is expanded and shutter 81, if adjusted to the lower edge of aperture 83 under standard conditions, has now taken a position below the edge of aperture 81 in an effort to still further increase the area for light flow.

Movement of shutter 81 below the point at which it coincides with the bottom of aperture 83 introduces error into the device, since it makes no actual change in the area through which light may pass to impinge on cell 5. It is necessary that the shutter have that position of coincidence with respect to aperture 83 at the beginning of a flight. Therefore turnbuckle 92 is adjusted to set shutter 81 in coincidence with the bottom of the slot, and the area of aperture 83 is increased by actuation of knob 48 to provide the necessary ratio of light impinging on cell 5 and 6 respectively. This light ratio acts through the bridge and amplifier to energize motor 31 in such fashion as to move indicator 43 to a position consistent with the departure of temperature from the standard, and this corrects the instrument for temperature variations at the reference point.

It will be appreciated that an increase in the illumination falling on photoelectric cell 5 (which lowers its resistance) is effectively the same in the bridge circuit as a decrease in the illumination of photoelectric cell 6 (which raises its resistance), and that the opposite is also true.

As the temperature decreases the shutter 81 pivots upward so as to progressively close a portion of the slot 83 thereby decreasing the light supplied to the cell 5. If the decrease in temperature is at a rate greater than that in the standard atmosphere, this decrease in light is of such magnitude as to unbalance the bridge in the same sense as motion of member 63 downward: that is, motor 31 is actuated to decrease the reading of the indicator and to reduce the force of spring 47 on aneroid 65. A decrease in temperature thus has the same effect on the bridge circuit and the motor as an increase in pressure due to a decrease in altitude. An increase in temperature has the opposite effect. The introduction of these factors into the readings of the instrument corrects the instrument for errors introduced by the expansion or contraction of the gas mass or free atmospheric air column resulting from changes in the temperature thereof above or below an assumed standard value.

As is well known in the art and graphically shown in Figure 11, the vertical distance traveled for each unit of barometric pressure fall increases with the altitude. Therefore, in order to secure a scale evenly divided in altitude units the ratio of the movement of the indicator means 43 to the deflection of the pressure responsive element 65 must vary continuously with the altitude. For this purpose the cam 46 is so shaped that the movement of the cam 46 required for unitary increase in the tension in spring 47 increases as the indicated altitude increases so that the ratio between unit increase in altitude indications and unit of atmospheric pressure fall is properly increased with the altitude.

This is specifically accomplished by constructing the cam 46 so that the pitch of the actuating cam surface decreases in proper proportion for the assumed standard of operation as the cam is turned in response to a decrease in atmospheric pressure or rise in altitude. Thus as the altitude increases the rotary movement of the cam 46 necessary to return the aneroid to the starting or zero position is increased per unit of pressure fall.

Further, as previously explained, as the temperature of the atmospheric air contacted by the bulb 61 decreases, the shaft 45 is rotated by the motor 31 so as to turn the cam 46 in a counterclockwise direction decreasing the tension of the loading spring 47 so that the aneroid 65 may expand upward to a position where slider 63 so limits the passage of light to photoelectric cell 6 that the bridge circuit 35 is balanced.

Figure 11 shows that the barometric pressure at an altitude of 25,000 feet in a standard atmosphere is 278 millimeters of mercury: in the atmosphere of lower mean temperature the pressure is 290 millimeters, while in that of higher mean temperature the pressure is 255 millimeters. An uncorrected altimeter is calibrated in terms of the standard atmosphere, and therefore reads 24,250 feet in the colder atmosphere and 27,500 feet in the warmer atmosphere, although the plane is actually at an altitude of 25,000 feet in each case. In order to bring about a correct reading of my altimeter in the warm atmosphere, my spring 46 must increase its pressure upon aneroid 65 by an amount equal to the pressure differential between 27,500 feet and 25,000 feet or 23 millimeters of mercury. The aneroid is actually working in the 27,500 foot range while the indicator and therefore cam 46 is working in the 25,000 foot range. Similarly, in order to bring about a correct reading of my altimeter in the colder atmosphere, my spring 46 must decrease its pressure upon aneroid 65 by an amount equal to the pressure differential between 25,000 feet and 24,250 feet: that is, by 12 millimeters of mercury.

Now suppose that the craft rises to an actual elevation of 26,000 feet. In the standard atmosphere the pressure is 268 millimeters of mercury. In a colder atmosphere it is 278 millimeters, and in a warmer atmosphere it is 242 millimeters. The change in pressure in the standard atmosphere is 10 millimeters. In a colder atmosphere the change is 12 millimeters while in the warmer atmosphere the change is 13 millimeters. The indicator of my compensated altitude must move through a distance proportional to the change of 10 millimeters, regardless of the atmosphere. My temperature compensator, therefore, alters the operative standard of the altimeter so that the same change in indicated altitude takes place whether the change in barometric pressure be 10 millimeters in an atmosphere of standard temperature, 12 millimeters in a warmer atmosphere, or 13 millimeters in a colder atmosphere.

In certain simplified applications it may not be desired to have the temperature responsive device include both responsive and manually operable members. In such an application a modified form of means for controlling the light supplied to photo-electric cell 5 may be provided such as shown in Figure 4, wherein a fixed light control member 95 is provided having formed therein an aperture 96. Affixed to a shaft 97 pivotally connected to the member 95 is a shutter 98. Mounted on the shaft 97 is also a gear 99 intermeshing with a second gear 74 affixed to one end of a control shaft 75 which is journaled in a bearing arm 49 projecting from the member 95: said shaft 75 passes through a suitable aperture formed in the control panel 54. A control knob 55 is mounted on the shaft 75 for adjustment of the shutter 98. A pointer 56 may be provided on the knob 55 for cooperation with a suitable indicator scale as shown in Figure 5. The member 95 and control shutter arrangement may be readily substituted for the temperature responsive control shutter for controlling the illumination passing from light 51 to the photo-electric cell 5 the amount of light passing through the aperture 96 being controlled by the position of the shutter 98.

An altimeter of the type embodying manually adjustable control means such as shown in Figure 5 is readily adapted for use where accurate correction factors are available.

Thus, for example, if a ground operator in a commercial air line organization finds that in order to correct the ground altimeter so as to indicate the actual ground altitude at the ground level it is necessary to adjust the position of knob 77, such information can be conveyed by radio to the pilot of the plane. Similar information regarding the temperature at the ground station may be given to the pilot in the same way. The information supplied to the pilot enables him to operate knobs 48 and 77 so that suitable correction for change in the atmsopheric condition at the bottom of the column of air may be made. The altimeter then operates at an assumed standard based upon actual ground atmospheric conditions rather than upon an assumed standard based upon an assumed ground atmospheric condition. Thus, at the altitude to be measured the margin of error is relatively slight since the indicated altitude is in error at the point of measurement only insofar as the atmospheric conditions at such point varies from the known ground atmospheric conditions rather than from an assumed ground atmospheric condition. Further, if desired, the reading of the altimeter may be corrected for temperature conditions existing at the upper level or point of flight or for the difference between the ground temperature and the temperature at the flight level.

Figures 7, 8:
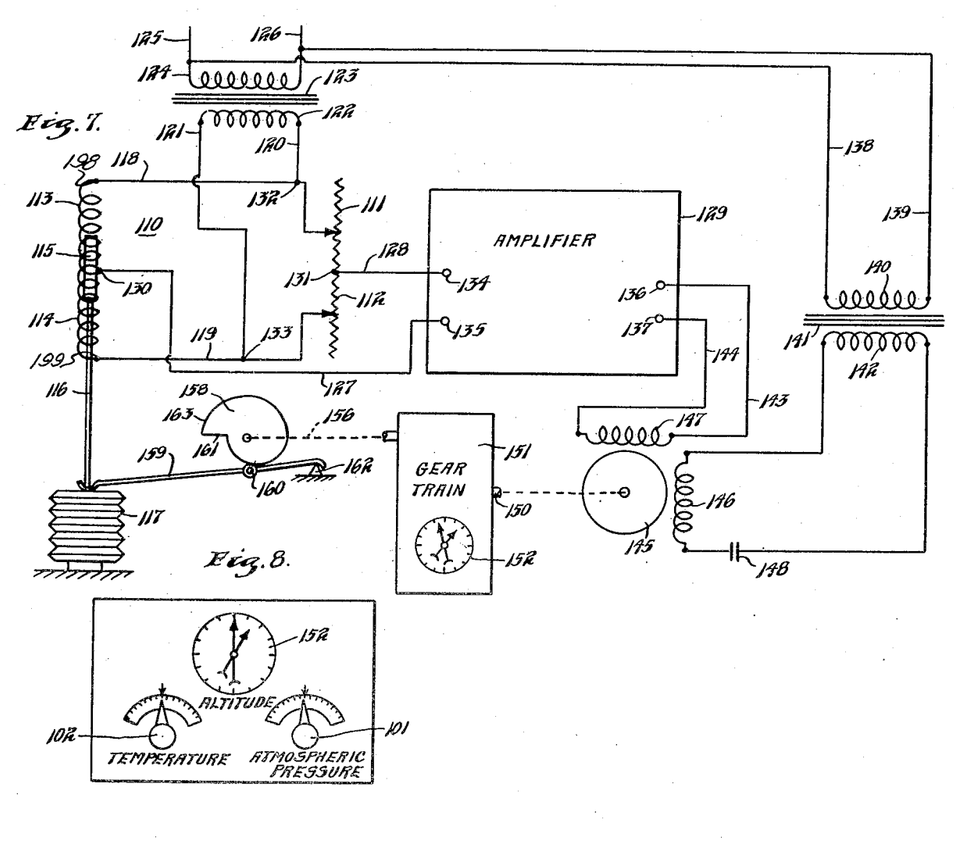
Figure 7 represents a circuit diagram of a system embodying a second form of my invention.
Figure 8 is a front elevation of the control panel for the form of my invention shown in Figure 7.

In a further form of my invention illustrated by Figure 7 there is provided a variable reluctance or impedance bridge circuit indicated generally by the numeral 110 and including variable resistances 111 and 112 having a common terminal 131 and impedance coils 113 and 114 having a common terminal 130. The resistance 111 is connected to the impedance coil 113 by a conductor 118 while the resistance 112 is connected to the impedance coil 114 by a conductor 119.

A pair of terminals 132 and 133 are located on conductors 118 and 119, and constitute the input terminals of the bridge circuit. The bridge is energized from the secondary winding 122 of a transformer 123, to which connection is made by conductors 120 and 121. Current is provided in secondary winding 122 by transformer action from primary winding 124, which is supplied with alternating current from any suitable source by conductors 125 and 126.

Terminals 130 and 131 comprise the output terminals of bridge circuit 110, and are connected as by conductors 127 and 128 with input terminals 134 and 135 of an amplifier 129 having output terminals 136 and 137.

It will be readily seen that the coils 113 and 114 form two adjacent arms of the variable impedance bridge circuit 110. The variable resistance windings 111 and 112 form the opposite arms of the bridge circuit 110.

Coacting with the coils 113 and 114 is a movable core 115. The core 115 of magnetic material is operably connected by a rod 116 to an atmospheric pressure responsive member or aneroid 117.

The bridge circuit 110 is so arranged that normally with the core 115 positioned substantially equally within the two coils 113 and 114 the bridge circuit 110 is balanced and no potential appears across output terminals 130 and 131.

However, upon a decrease in atmospheric pressure permitting the expansion of the aneroid 117, the core 115 moves upward. The core 115 then approaches further toward or extends further into the coil 113 and is correspondingly removed further from or project less into the other coil 114. The magnetic flux threading the coil 113 therefore increases, increasing the impedance of the coil 113, and the flux through the coil 114 decreases, decreasing the impedance of the coil 114, thus unbalancing the bridge circuit in such fashion that a potential difference appears between terminals 134 and 135 having the same polarity and time-phase relation as the potential difference between terminals 130 and 131, and of a magnitude proportional to the unbalance of the bridge. This potential difference is fed through output conductors 127 and 128 to input terminals 134 and 135 of amplifier 129.

Further, upon the atmospheric pressure increasing so as to cause the contraction of the aneroid 117 and the downward movement of the core 115 past the balancing point of the bridge circuit 110, the impedance of the coil 113 is decreased and the impedance of the coil 114 increased unbalancing the bridge circuit in such fashion that a potential difference appears between terminals 134 and 135 having the same polarity and time-phase relation as the potential difference between terminals 130 and 131, and also of a magnitude proportional to the unbalance of the bridge. This potential difference is then fed directly to terminals 134 and 135 of amplifier 129.

Since the instantaneous potential difference between conductor 118 and terminal 130 is 180° out of phase with that between conductor 119 and terminal 130, it will be seen that the potential difference impressed across terminals 134 and 135 of amplifier 129 when the impedance of coil 113 is increased is of the opposite phase to that impressed on the amplifier input when the impedance of coil 114 is increased. It should also be pointed out that an increase in the impedance of coil 113 is effectively the same as a decrease in the impedance of coil 114.

The amplifier 129 may be any suitable type of electronic amplifier well known in the art such as shown for example in the previously noted Patent No. 1,586,233, granted May 25, 1926, to Anschutz-Kaempfe, or may be preferably an electronic amplifier of the type shown and described in the aforenoted co-pending application of Albert P. Upton, Serial No. 437,561, dated April 3, 1942.

A motor 145 is shown as being of the split phase type having a pair of field windings 146 and 147 which are mechanically 90 degrees apart in phase. Winding 147 is connected by the conductors 143 and 144 to the output terminals 136 and 137 of the amplifier 129.

A transformer 141 is provided for continuously energizing the motor winding 146, said transformer having a primary winding 140 and a secondary winding 142. The primary winding 140 is connected through conductors 138 and 139 to conductors 125 and 126 which are in turn connected to a suitable source of alternating current.

Current is supplied to the secondary winding 142 through transformer action from the primary winding 140. Motor winding 146 is continuously energized from the secondary winding 142 of the transformer 141. A condenser 148 is connected in series between the secondary winding 142 and the motor winding 146 and causes a phase displacement of substantially 90° between the current flowing in the winding 146 and the terminal voltage of the secondary winding 142.

As described in detail in the co-pending Upton application previously referred to, the amplifier 129 is of a type which produces in the branch of the output circuit including conductors 143 and 144 and motor winding 147 an alternating current of the same phase and frequency as the potential applied to input terminals 134 and 135. Since transformer primary windings 124 and 140 are both connected to the same alternating current supply lines 125 and 126, it will be understood that the potential appearing at the terminals of the secondary windings 122 and 142 are of the same phase. The current flowing through winding 146 is, however, shifted substantially 90 electrical degrees with respect to this potential by the condenser 148, as previously explained. The winding 147, on the other hand, is supplied with current either in phase or 180° out of phase with the terminal potential of windings 122 and 142 depending upon the direction of unbalance of the bridge circuit 110.

In accordance with well known characteristics of a split phase motor, when the windings 146 and 147 are supplied with currents 90° out of phase, the motor 145 is caused to rotate in a predetermined direction. The operation of a split phase motor of the type described herein is described in the co-pending Upton application previously referred to.

The motor 145 is adapted to drive a shaft 150 in a direction depending upon the unbalancing of the bridge circuit 110 and the resultant current supplied from the amplifier to the motor 145. The shaft 150 is, in turn, adapted by suitable means such as the gear train 151 to drive an indicator means 152, which is of a suitable type well known in the art. Moreover, the motor 145 is further adapted by suitable means such as the shaft 150, train of gears 151 and shaft 156, to turn a cam 158 so as to adjust the tension of a loading spring 159 for a purpose which will hereinafter be explained. The cam 158 cooperates with a roller member 160 mounted on the loading spring 159 for the adjustment of the tension of the spring 159. The loading spring 159 is pivoted at one end on a fixed knife edge 162 and engages at the opposite end the aneroid 117 exerting a force thereon dependent upon the adjustment of the cam 158.

It will be seen that upon a decrease in pressure, as on a rise in altitude, the aneroid 117 expands forcing the rod 116 upward against the tension of the spring 159. Moreover, the upward movement of the rod 116 likewise moves the core 115 upward which as previously explained increases the impedance of the coil 113 and decreases the impedance of the coil 114 and thereby cause an unbalancing of the variable reluctance bridge circuit 110. The unbalanced potential is amplified by the amplifier 129 in a manner previously described and the thus amplified electromotive force drives the motor 145 so as to rotate the shaft 150 in a direction to cause the actuation of the indicator means 152 in a manner well known in the art so as to indicate an increase in altitude. Moreover, the motor also, upon such unbalancing of the bridge circuit 110, turns the shaft 156 through the shaft 150 and intermeshing gear means 151 to turn the cam 158 in a clockwise direction so as to cause downward movement of the roller 160 thereby increasing the tension exerted by the spring 159 on the aneroid 117. This in turn causes the contraction of the aneroid 117 under the atmospheric pressure and the additional tension of the loading spring 159 to cause downward movement of the rod 116 until the core 115 is once again positioned in such a manner as to balance the bridge circuit 110, whereupon the motor 145 ceases actuating cam 158 and the indicator means 152.

Upon an increase in atmospheric pressure, as in the case of a decrease in altitude, the aneroid 117 contracts causing a downward movement of the rod 116 and causing the core 115 to increase the impedance of coil 114 and decrease the impedance of coil 113. The amplified unbalanced potential of the circuit 110 now causes rotation of the motor 145 in a direction opposite to that in the preceding paragraph, moves the indicator means to indicate the decrease in altitude and rotates the cam 158 in a counter-clockwise direction so as to decrease the tension of the loading spring 159. The decreasing tension of the spring 159 permits expansion of the aneroid 117 and upward movement of the core 115 to a position balancing the bridge circuit 110, whereupon the unbalanced potential ceases and the flow of amplified current to the motor 145 terminates. The movement of the motor 145 thus stops until the bridge circuit 110 is once again unbalanced.

Cam 158 turns in a clockwise direction as the indicated altitude increases, and the function of this cam is the same as that of cam 46 clearly set forth previously.

In order to more accurately adjust the altimeter by taking into account the barometric pressure at the ground and for variations from the standard mean temperature at the upper level, I have provided the adjustable resistances 111 and 112 which under assumed standard starting or ground level conditions are of equal resistance. The variable resistance 111 is adapted to be operated by a knob 101, as shown in Figure 8, so that upon a decrease in barometric pressure below the assumed standard for the ground or starting level, the resistance 111 may be increased in accordance with a predetermined adjustment scale and thereby cause the unbalancing of the bridge circuit 110, and an unbalance potential therefore appears across terminals 134 and 135. This unbalance potential amplified, as previously explained, then causes the motor 145 to rotate in a manner previously described so as to decrease the altitude readings and to turn the cam 158 in a counter-clockwise direction so as to decrease the ratio between change in indicator readings and pressure change, and to decrease the force exerted by the loading spring 159 on the aneroid 117. The decrease in tension of spring 159 in turn causes the core 115 to rise until the impedance of coil 113 is increased and the impedance of coil 114 decreased to a point whereupon the bridge circuit 110 is once again balanced. Thus, correction is affected for altitude readings which if uncorrected would under an assumed indicator standard read too high due to a decrease in the pressure of the air column at the ground or starting level of the measurement.

Further, upon an increase in the ground barometric pressure causing the altimeter at the original standard of operation to indicate an altitude below tthe true altitude, the resistance 111 may be decreased by adjustment knob 101 in accordance with a predetermined adjustment scale as shown in Figure 8, causing the unbalancing of the previously balanced bridge circuit 110 so that the current due to the unbalance potential flows through the resistance 111 and coil 114 causing in turn the motor 145 to rotate so as to turn the indicator 152 to increase the indicated altitude. The motor 145 simultaneously turns the cam 158 in a clockwise direction so as to increase the ratio between pressure change and change in indicator readings, and to increase the tension in spring 159 whereupon the atmospheric pressure acting upon the aneroid 117 together with the increased compressive force of spring 159 tends to force the core 115 downward until the impedance of coil 114 is increased and the impedance of coil 113 decreased to a point whereupon the bridge circuit 110 is once again balanced. Thus the standard of operation of the altimeter may be adjusted for the actual pressure conditions existing at the ground or starting level of the measurement.

It will be obvious that the effect of varying the resistance of the resistor 111 in this modification of the device is the same as the effect of varying the setting of knob 77 in my first embodiment. In a similar fashion, varying the resistance of resistor 112 in the present modification has the same unbalancing effect on bridge circuit 110 as varying the setting of knob 48 or knob 55 in my first embodiment. A decrease in the resistance of the resistor 112 unbalances bridge circuit 110 in the same direction as an increase of the impedance of winding 114, energizing the motor to operate the indicator and rebalance the bridge by means of core 115.

A knob 102 is provided for adjusting the resistance of resistor 112, and the knob may have a pointer for cooperation with graduations suitably calibrated in temperature units to give correlated interrelation between actuation of knob 102 and the remainder of the device, these graduations being carried by a suitable control panel.

It will thus be seen that in the form of my invention illustrated in Figure 7, I have provided separate manually operable electrical control means for adjusting the altimeter for ground atmospheric pressure and for changes in the temperature of the free atmospheric air whereby the return or zero point of the aneroid may be adjusted and the multiplication ratio of the indicator means varied. Thus, the standard of operation of the altimeter may be adjusted so as to operate accurately with a minimum of error under conditions other than those of the standard to which the instrument was calibrated. In the form of my invention disclosed in Figure 7, if the temperature gradient of the air column approximates that of the assumed standard, and the above described adjustment is made for ground temperature deviation from the standard, the cam arrangement 158 and spring 159 are so constructed as to increase the multiplication ratio of the indicator means as altitude increases. The instrument thereby properly reflects an increase in vertical distance traveled per unit of pressure as the altitude increases.

However, unless further compensated, such altitude readings may depart from the true altitude insofar as the temperature gradient or mean temperature of the actual air column differs from that of the assumed standard atmosphere. The extent of such error as shown in Figure 11 is substantially negligible at the relatively lower altitudes but the error increases with the altitude and represents a substantial error particularly at the greater heights.

Figures 9, 10:
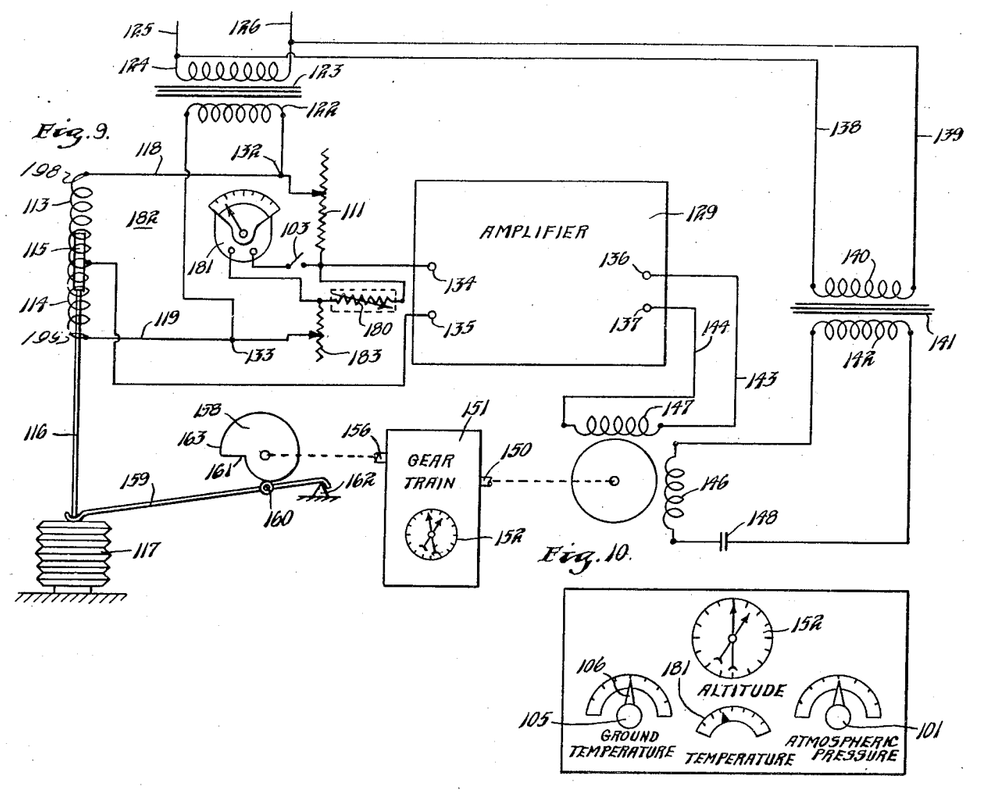
Figure 9 represents a circuit diagram illustrating a further modified form of my invention.
Figure 10 is a front elevation of the control panel for the form of my invention shown in Figure 9.

In order therefore, to compensate for such errors, I have further provided in the form of my invention illustrated in Figure 9 automatic temperature correcting means. Thus, I have provided an electric thermometer or resistor 180 of a metal such as nickel having a positive temperature coefficient of resistance. The resistor 180 is mounted so as to be directly affected by the temperature of the free atmospheric air. Thus, upon the temperature of the free atmospheric air decreasing the resistance of the member 180 will be reduced, and similarly upon an increase in the temperature of the free atmospheric air the resistance of the member 180 will be increased. A micro or milli voltmeter 181 is shunted across the resistance 180 and is directly affected by the variations in the resistance thereof caused by the rise or fall of the temperature of the free atmospheric air. The meter 181 has a scale graduated so as to indicate degrees of temperature of the free atmospheric air acting upon the resistor 180. A switch 103 is provided for connecting the meter 181 in and out of the circuit.

Resistor 180 is connected in series with a variable resistance 183 which may be formed of a material such as manganin the electrical resistance of which is relatively unaffected by temperature change. Resistors 180 and 183 form one arm of a bridge circuit 182 which is otherwise essentially the same as the bridge circuit 110 previously shown in Figure 7 wherein like numerals indicate similar parts. The resistance of the variable resistance 183 is so arranged that at the ground or starting level the same may be manually varied by adjusting the knob 105, Figure 10. The knob 105 has a pointer 106 cooperating with suitable scale markings whereby the resistance 183 may be increased proportionately as the temperature of the atmospheric air at the starting level decreases below the assumed standard causing in response thereto the resistance of the resistor 180 to decrease as the temperature of the free atmospheric air decreases. Thus, the resistance 183 compensates for the other variable resistance 180 at the ground level. Similarly the resistance 183 may be manually adjusted so as to decrease proportionately as the resistance of the resistor 180 is increased in response to a temperature rise at the ground or starting level. Thus, at the ground level the effect of the one cancels the effect of the other and the temperature compensating means at the ground or starting level does not cause the altering of the indicator reading. Any change in the ground reading due to a variation from the standard of the atmospheric pressure at the ground level is compensated by the adjustment of the variable resistance 111 in the manner previously described with reference to the form of Figure 7. However, during flight the resistance 183 may be manually adjusted by the knob 105 in accordacce with suitable scale markings such as shown in Figure 10 for actual atmospheric temperature at the ground level, which information may be conveyed to the operator by radio or other suitable means.

However, upon the altimeter being raised by an airplane or other suitable means through the air column, the resistance 183 after adjustment to ground temperature conditions remains constant as it is not subject to variation in the temperature of the atmospheric free air, while the resistance of the thermometer resistor 180 varies with the temperature of the free atmospheric air, thereby varying the resistance of the arm of the bridge circuit 182 including the resistances 183 and 180. However, since the resistance 183 remains constant after adjustment to ground atmospheric temperature and the resistor 180 changes in accordance with the temperature of the atmospheric free air, it will be readily seen that the effect of such arrangement is to continuously adjust the operative standard of the altimeter while passing through the column of air for an average temperature between that existing at the lower end of the column of air and at the point of measurement. It will be apparent that the function performed by resistor 180 in the present modification of my invention is strictly analogous so that performed by member 81 and so forth in the modification disclosed by Figure 1, and that members 81 and 86 of Figure 1 together are the equivalent of members 180 and 183 in the present modification.

In summary, it will be seen that I have provided novel compensating means for an altimeter whereby the calibration of the instrument may be adjusted at any time to accord with the atmosphere through which the craft is flying. The device operates without adjustment in a standard atmosphere, and is adjustable, in part automatically and in part manually, to accord with the deviating conditions of any other atmosphere. Manual adjustment is provided for both pressure and temperature at the ground level, and automatic adjustments maintain the instrument in constant calibration with regard to the pressure and temperature of the ambient atmosphere.

There is thus provided a novel altitude gauging apparatus which provides a continuous automatic means for correcting the indicated altitude in accordance with the vertical mean temperature distribution in the column of air through which the apparatus passes based upon the temperature at the lower and upper level of measurement.

Although several embodiments of the invention have been illustrated and described in detail, it is to be expressly understood that the invention is not limited thereto, and that various changes may be made in the design and arrangement of the parts without departing from the spirit and scope of the invention as the same will now be understood by those skilled in the art. For a definition of the limits of the invention, reference will be had primarily to the appended claims.

I claim as my invention:

1. An altimeter comprising, in combination, an atmospheric pressure responsive means, an altitude indicating means, adjustable transmission means for driving the indicating means in accordance with the response of the atmospheric pressure responsive means, and means for adjusting the transmission means whereby the rate of change in altitude indications for unit of atmospheric pressure change may be varied, said adjusting means including a first and second manually operable means to regulate said operative standard in accordance with first and second atmospheric conditions existing at the starting level of measurement and third means to regulate said operative standard in accordance with the variation, from an assumed standard, of an atmospheric condition existing at the level of measurement.

2. An altimeter comprising, in combination, an atmospheric pressure responsive means, an altitude indicating means, adjustable transmission means for driving the indicating means in accordance with the response of the atmospheric pressure responsive means, and means for adjusting the transmission means whereby the rate of change in altitude indications for unit of atmospheric pressure change may be varied, said adjusting means including a manually operable means to regulate said operative standard in accordance with atmospheric pressure conditions existing at a starting level of measurement and further means to regulate said operative standard in accordance with temperatures of the free atmospheric air existing at the starting level and at the level of measurement.

3. An altimeter comprising, in combination, an atmospheric pressure responsive means, an altitude indicating means, transmission means for driving the indicating means, adjustable in accordance with the response of the atmospheric pressure responsive means, and means for adjusting the transmission means whereby the rate of change in altitude indications for unit of atmospheric pressure change may be varied, said adjusting means including first manually operable means to regulate said operative standard in accordance with atmospheric pressure conditions existing at a starting level of measurement, second manually adjustable means to regulate said operative standard in accordance with the temperature of the free atmospheric air existing at the starting level of the altitude measurement, and third means for influencing said operative standard in accordance with the temperature of the free atmospheric air existing at the level of the altitude measurement, said second and third means arranged in such a manner as to regulate said operative standard in accordance with the arithmetic mean of the temperatures of the free atmospheric air at the starting level and at the level of the altitude measurement.

4. An altimeter comprising in combination an atmospheric pressure responsive means movable from a first position to a second position, a counter biasing means acting upon the atmospheric pressure responsive means, a resetting mechanism actuable to vary the force of the counter biasing means in such a manner as to return the atmospheric pressure responsive means from the second position to the first position, means operatively connecting said responsive means with said resetting mechanism in controlling relation thereto, said last named means including first and second manually operable means for actuating the resetting mechanism so as to vary the said return position of the measuring member, first visual indicating means whereby the position of said first manually operable means may be correlated with specific values of atmospheric pressure, and second visual indicating means whereby the position of said second manually operable means may be correlated with specific values of atmospheric temperature.

5. An altitude measuring device comprising in combination, a plurality of electrical resistors forming an electrical bridge circuit, two of said resistors being adjustable for atmospheric temperature and atmospheric pressure conditions at the starting level of the altitude measurement, another of said resistors responsive to atmospheric temperature and having electrical characteristics variable by changes in atmospheric temperature, a slidably mounted magnetic core surrounded by inductors in opposed legs of said bridge circuit, an atmospheric pressure responsive member operatively connected to said core whereby upon movement of said atmospheric pressure responsive member movement is imparted to said core in such a manner as to vary the impedance in said inductors in the opposed legs of said bridge circuit, a spring means biasing the pressure responsive member, adjustment means for varying the tension of the said spring means, motor means energized upon the unbalancing of said bridge circuit for adjusting the said adjustment means so as to vary the tension of the spring means so as to cause thereby the movement of the said member adjusting the core for rebalancing the bridge circuit, and an altitude indicating device actuated by the said motor means in response to the movement thereof, whereby the altitude indicating device is positioned in response to the atmospheric pressure existing at the point of measurement and the position of said indicating device corrected for the temperature to which said atmospheric temperature responsive resistor is subjected at the time of measurement and for atmospheric pressure and temperature conditions existing at the starting level of said measurement.

6. A pressure responsive instrument, comprising, in combination, a balanced bridge circuit, a pair of adjustable members for unbalancing said circuit, a motor means energized upon the unbalancing of said circuit, an atmospheric pressure condition responsive means operatively connected to one of said members and a temperature condition responsive means operatively connected to the other of said members, both said condition responsive means jointly controlling the unbalancing of said circuit, indicator means actuated by said motor means upon the unbalancing of said circuit, and biasing means actuated by said motor means for moving at least one of said members so as to rebalance said circuit.

7. An instrument comprising, in combination, a bridge circuit, a plurality of adjustable members for controlling the electrical balance of said circuit, a first condition responsive means and a second condition responsive means operating the said adjustable members in such a manner as to unbalance the circuit, indicator means, means actuating said indicator means upon the unbalancing of the circuit, biasing means effective upon actuation to alter the response of one of said condition responsive means, and means actuating said biasing means, upon unbalancing of the circuit, in such fashion as to alter the response of the last named condition responsive means to rebalance the circuit.

8. An instrument comprising in combination a measuring member movable from a first position under influence of the forces to be measured, a biasing means acting upon the measuring member, a source of light, a plurality of photo-electric cells arranged to be equivalently illuminated from said source, whereby to induce equivalent electrical responses from said cells, control means actuated upon movement of said measuring member for varying the ratio of light supplied to said cells in such a manner as to differentially affect said responses of said cells, motor means controlling the actuation of said biasing means, and means causing energization of said motor means in accordance with differential responses of said cells, whereby to actuate said biasing means in such a manner as to cause the return of the measuring member to the first position.

9. An instrument comprising in combination a measuring member movable from a first position under influence of the forces to be measured, a biasing means acting upon the measuring member, a source of light, a plurality of photo-electric cells arranged to be equivalently illuminated from said source, whereby to induce equivalent electrical responses from said cells, first control means actuated upon movement of said measuring member for varying the ratio of light supplied to said cells in such a manner as to differentially affect said responses of said cells, motor means controlling the actuation of said biasing means, means causing energization of said motor means in accordance with differential responses of said cells, whereby to actuate said biasing means in such a manner as to cause the return of the measuring member to the first position and second control means for varying the ratio of light supplied to said cells so as to cause said motor means to change the return position of the measuring member.

10. An altimeter comprising in combination, a normally electrically balanced bridge circuit, a single source of light, a first photo-electric cell, a second photo-electric cell, said photo-electric cells forming adjacent counter balancing arms of said bridge circuit, said cells of the electron emissive type arranged to receive light from said source, a first apertured control slide for regulating the intensity of the light supplied to the first cell from said source, a second apertured control slide for regulating the intensity of the light supplied to the second cell from said source, said control slides thereby regulating the electron emissions from said cells and thus the balance of said bridge circuit, an aneroid for movably actuating said first slide upon a change in atmospheric pressure, a spring exerting a tension upon said aneroid, a mechanism controlling the tension of said spring, an altitude indicating device, a free air atmospheric temperature responsive thermometer bulb of the distant type for movably actuating the second slide upon a change in temperature, and a reversible electronic drive motor controlled by the unbalanced potential of said bridge circuit and mechanically connected to said tension control mechanism and said indicating device, and upon movement of either of said slides causing the unbalancing of said bridge circuit energization of said motor is effected in such a manner as to adjust said indicating device and actuate said tension control mechanism so as to vary the tension of said spring causing the movement of said aneroid and movement of the first slide so as to balance the said bridge circuit, whereby the altitude indicating device is positioned in response to the atmospheric pressure existing at the point of measurement and the position of said indicating device corrected for the temperature to which said temperature responsive device is subjected at the time of measurement.

11. An instrument comprising in combination: an atmospheric pressure responsive member movable from a first position under the influence of the forces to be measured; a counter-biasing means acting upon said member; a normally balanced electrical bridge circuit; means associating said member with said bridge circuit, whereby movement of said member from said first position affects the balance of said bridge circuit; a resetting mechanism operatively associated with said bridge circuit for actuation upon unbalance of said bridge circuit to vary the force exerted by said counter-biasing means for returning said member to said first position; indicator means movably positioned by said resetting mechanism; and manually operable means for unbalancing said bridge circuit to bring about actuation of said resetting mechanism so as to vary the return position of said member and thereby adjust the position of said indicator means.

12. In an altimeter the combination with a resilient diaphragm movable from a first position in response to a change in atmospheric pressure acting thereon, of a tension spring acting upon said diaphragm, a source of light, a plurality of photoelectric cells arranged to be equivalently illuminated from said source whereby to induce equivalent electrical responses from said cells, a first control device actuated upon movement of said diaphragm for varying the intensity of the light supplied to said cells in such a manner as to differentially affect the electrical responses of said cells, a motor controlling the force exerted by said tension spring, and means causing energization of said motor means in accordance with differential responses of said cells, whereby to actuate said spring to cause the return of the diaphragm to the first position, a second control device for varying the intensity of the light supplied to said cells so as to differentially affect the electrical responses from said cells in such a manner as to cause said motor to change said first position of the diaphragm, and a free air atmospheric temperature responsive device for actuating the second control device.

13. An instrument, comprising in combination, a measuring member movable from a first position under influence of the forces to be measured, an additional biasing means acting upon the measuring member, a plurality of photoelectric cells arranged to be equivalently illuminated from said source, whereby to induce equivalent electrical responses from said cells, an indicator means, first control means actuated upon movement of said measuring member for varying the ratio of light supplied to said cells in such a manner as to differentially affect said responses of said cells, motor means controlling the actuation of said biasing means, and means causing energization of said motor means in accordance with differential responses of said cells, whereby to actuate said biasing means in such a manner as to cause the return of the measuring member to the first position, said motor means adjusting said indicator means during such return movement of said measuring member, and second control means for varying the ratio of light supplied to said cells in such a manner as to cause said motor means to change said return position of the measuring member and cause said motor to change the adjustment of said indicator means.

14. In an altimeter the combination with a resilient diaphragm movable from a first position in response to a change in atmospheric pressure acting thereon; of a tension spring acting upon said diaphragm, a source of light, a plurality of photoelectric cells arranged to be equivalently illuminated from said source, whereby to induce equivalent electrical responses from said cells, an indicating device, a first control device actuated upon movement of said diaphragm for varying the intensity of the light supplied to said cells in such a manner as to differentially affect the electrical responses of said cells, a motor controlling the force exerted by said tension spring, and means causing energization of said motor means in accordance with differential responses of said cells, whereby to actuate said spring to cause the return of the diaphragm to the first position, and said motor adjusting said indicating device during such return movement of said diaphragm, a second control device for varying the intensity of the light supplied to said cells so as to differentially affect the electrical responses from said cells in such a manner as to cause said motor to change said first position of the diaphragm and cause said motor to change the adjustment of said indicating device, and a free air atmospheric temperature responsive device for actuating the second control device.

15. An altimeter comprising in combination: movable means whose position is related to atmospheric pressure; movable means whose position is related to altitude indications on a fixed scale; adjustable means operatively connecting said first named movable means and said second named movable means, whereby movement of said first named movable means may cause movement of said second named movable means, said adjustable means comprising means for varying the ratio between movements of said connecting means and of said second named movable means, said ratio varying means comprising first manually operable control means effective to alter the rate of change of said altitude indications with changes in atmospheric pressure, and a second manually operable control means effective to alter the rate of change of said altitude indications with changes in atmospheric temperature; first calibrated means whereby actuation of said first control means may be interpreted in terms of deviation of actual atmospheric pressure at a reference level from a standard; and second calibrated means whereby actuation of said second control means may be interpreted in terms of the difference between the temperature ambient to said first named movable means and the temperature at said reference level.

PAUL F. SHIVERS.